Patented Aug. 7, 1951

2,563,614

UNITED STATES PATENT OFFICE 2,563,614

PHENOLIC RESIN AND METHOD OF MAKING THE SAME

Raymond Palmer, Pennington, N. J., assignor to The Continental-Diamond Fibre Company, Newark, Del., a corporation of Delaware No Drawing. Application July 25, 1947, Serial No. 763,756

19 Claims. (Cl. 260—19)

The present invention relates to a novel process of making resinous phenolic condensation products of both the oil-noncompatible and the oil-soluble types and to the resulting product; and more particularly the invention relates to a process by which phenol-formaldehyde condensation products of both types possessing novel and advantageous properties may be readily and economically prepared.

The conventional process of making initial-heat-convertible phenol-formaldehyde condensation products or resins requires a considerable length of time in which to react the phenolic material and the formaldehyde-yielding substance. These methods generally involve the mixing of all of the reacting materials together prior to the initiating of the reaction. Heat is then applied and the reaction continued until the degree of condensation desired is obtained. Furthermore, products resulting from this conventional procedure in which all the reactants are mixed together and then heated, possess at times, low mechanical properties or values, which may be due to the formation of a non-uniform mixture of mono- and polyalcohols. The conventional resins so prepared are oil-noncompatible. When a resin combined with oil (termed in the art an oil-soluble resin) is desired, an active catalyst such as an acid or a strong dehydrating agent (for example, zinc chloride) is relied upon to hydrolyze the oil and cause a reaction between the phenolic resin and the oil. In such procedures, the characteristic properties of the oil are often changed, and brittleness of the product may result. As will hereinafter appear, the process of the present invention overcomes the disadvantages of the prior processes and the resulting products, whether of the oil-noncompatible or the oil-soluble type, are characterized by advantageous and improved properties.

One object of the present invention, therefore, is to provide a novel and economical process of preparing phenol-formaldehyde resins by which the difficulties inherent in the conventional procedure may be overcome and by which resins possessing superior properties, including superior mechanical and electrical values, may be produced.

Another object is to provide a process as the result of which a phenol-formaldehyde resin characterized by fast-curing properties, as compared to conventional phenol-formaldehyde resins made of the same raw materials, may be obtained.

A further object of the invention is to provide a relatively simple process by which an oil may be incorporated with a phenol-formaldehyde resin composition to produce a phenol-formaldehyde-oil resin composition which not only possesses relatively fast curing properties, but is also available for the production of laminated products possessing resiliency and high electrical insulation values.

Other objects, including the provision of phenol-formaldehyde resins of the advantageous properties herein described, will be evident from a consideration of the specification and the claims.

In accordance with the process of the present invention, the phenol-formaldehyde resin, whether of the oil-noncompatible or the oil-soluble type, is prepared by adding the phenol to a hot aqueous solution of the formaldehyde-yielding substance, and the reaction is conducted in the presence of a basic catalyst. The addition of the phenol to the hot aqueous solution of the formaldehyde-yielding substance insures an excess of formaldehyde, and a more uniform product is, therefore, obtained than results from conventional procedures. The temperature of the reactants is not permitted to fall below about 70° C., preferably not below about 80° C., and the condensation reaction is then permitted to proceed. The reaction is exothermic and usually the heat liberated will bring the mixture to the desired temperature for the reaction but the temperature may be raised, if desired, by the application of external heat. The condensation reaction is advantageously conducted at a temperature corresponding to the boiling or refluxing point of the reaction mixture.

In the preferred embodiment for the preparation of an oil-noncompatible resin, the phenol is added to a boiling solution of the formaldehyde-yielding material and the temperature of the reacting mixture is not permitted to fall appreciably, for example, not below about 90° C. and preferably not below about 95° C. Advantageously, the aqueous solution of the formaldehyde-yielding substance is maintained in a boiling condition during the addition of the phenol. The temperature of the aqueous solution of the formaldehyde-yielding substance may, if desired, be below the boiling point and may even approach 70° C. provided that the addition of the phenol does not reduce the temperature below about 70° C. Advantageously, however, the temperature is not permitted to drop below about 80° C. An appreciable temperature drop may be avoided by the gradual addition of the phenol to the solution of the formaldehyde-yielding substance or preheated phenol may be employed. If a temperature of about 70° C. is reached, it may be necessary to supply external heat, but when the temperature does not go below about 80° C., the exothermic heat liberated by the reaction may be relied upon to maintain the desired temperature. In any case, the temperature of the solution of the formaldehyde-yielding substance and the manner of the addition of the phenol or its temperature, will be controlled so that the desired temperature of the reacting mixture of between about 70° C., preferably between 80° C. and the boiling point of the aqueous solution of the formaldehyde-yielding substance, will be maintained.

The basic catalyst may be present in the solution of formaldehyde-yielding substance or in the phenol.

In the preparation of the oil-containing resin, the oil is added to the reacting mixture of the phenol and the formaldehyde-yielding substance before substantial condensation of the phenol alcohols formed has taken place, i. e., before there is a substantial increase in the viscosity of the reacting mixture. In the preferred embodiment, the process is so conducted that the oil is present during the formation of the phenol alcohols. Hence, it is advantageous to add the oil at the same time as the phenol or immediately after its addition. Since the oil is miscible with the phenol, it may be mixed with phenol and added to the hot solution of the formaldehyde-yielding substance with the phenol. The statements given above concerning the temperature conditions and the methods of mixing the phenol with the hot solution of the formaldehyde-yielding substance so as to avoid an undesirable temperature reduction, apply also to the case where oil is added. In other words, the oil, or oil-phenol mixture may be added gradually and/or may be pre-heated.

After the reactants have been added, the mixture is refluxed, advantageously at atmospheric pressure, to obtain the desired degree of condensation usual in the production of phenol-formaldehyde resins, and the time required may vary from five minutes to two hours or longer, depending to some extent on the amount and type of catalyst. Usually, when an oil is present, the refluxing time will be longer than is the case when an oil-noncompatible resin is to be prepared.

After the reaction has reached the desired degree of condensation, the excess water is removed from the reaction product by the usual procedure. In the case of the oil-non-compatible resin, the water may be removed by vacuum distillation, for example, by distilling the reaction mixture to a temperature of about 95° C. under a vacuum of about 27" of mercury. In the case of an oil-containing resin, the excess water may be removed by vacuum distillation or by distilling at atmospheric pressure or by a combination of the two. In a typical case, the reaction mixture may be heated under a vacuum of about 27" of mercury until a temperature of about 90° C. to 100° C. is reached and thereafter distilled at atmospheric pressure to remove the excess water and to obtain the body or viscosity desired. In order to insure compatibility between the oil and the resinous product, the oil-containing product is heated to a minimum temperature of about 120° C., usually between about 130° C. and 150° C., but the product may be heated to 160° C. or even higher if desired.

As is usual in the manufacture of phenol-formaldehyde resins, the phenolic material, referred to herein generically as "the phenol," employed is a monohydric phenol or a mixture of such phenols capable of reacting with formaldehyde to form a heat-convertible resin. In the preferred embodiment of the oil-non-compatible resin, phenol, cresols, xylenols, or a mixture thereof, such for example as commercial phenol or commercial cresylic acid, is used. In the case of the oil-compatible resin, a xylenol or a higher homolog of phenol will make up at least part of the phenolic material and usually will be present in an amount in excess of 15% to 20% of the other phenols present in the phenolic material. Preferably, in the preparation of such a resin, the amount of the compound, phenol, present in the phenolic material employed will not exceed 20% to 30% and advantageously will be present in smaller amounts. If desired, the phenolic material may be a mixture of xylenol and cresol, such as commercial cresylic acid, preferably a cresylic acid which contains a relatively small amount of phenol. In a typical case, the phenolic material employed in the preparation of the oil-compatible resin is made up of phenol 20%, cresols 30%, consisting primarily of meta- and para-cresols, and xylenols (boiling range 211° C.–225° C.) 50%. If desired, other phenols such as para-tertiary amyl or butyl phenol, trimethyl phenol, cardinol (cashew nut shell oil) and the like may be present with the phenol, cresols, or xylenols or mixtures thereof, provided that the latter is or are present in sufficient amount to impart to the resinous composition heat-convertibility and the other desirable properties characteristic of resins made therefrom.

The formaldehyde-yielding substance may be any one or a mixture of two or more of the compounds usually used to furnish the formaldehyde in the production of a phenol-formaldehyde resin, for example formaldehyde, paraformaldehyde, and hexamethylenetetramine. As stated, these materials are dissolved to form an aqueous solution and the concentration thereof may vary widely; for example, dilute solution of about 10% may be used. Preferably, however, a solution of about 37% (by weight) of formaldehyde will be employed.

As previously stated, the phenol and the formaldehyde-yielding substance are reacted in the presence of a basic catalyst, examples of which are ammonium hydroxide, sodium hydroxide, sodium carbonate or bicarbonate, and calcium or barium hydroxide or other compounds producing an alkaline or basic reaction in an aqueous solution. The amount of catalyst will depend to some extent on the activity thereof and will generally be present in an amount between ½% and 7% based on the weight of the phenol. When hexamethylenetetramine is the formaldehyde-yielding substance, the solution will usually be of sufficient alkalinity so that additional basic material need not be added.

The amount of formaldehyde present will be sufficient to provide a heat-convertible or one-stage resin and the ratio of the phenol to formaldehyde may vary between about 1 mol of the former to 0.9 mol of the latter and about 1 mol of the former to 2 mols of the latter. In the preferred embodiment, the mol ratio of phenol to formaldehyde will be between about 1 to 1 and about 1 to 1.2. It is to be understood that when the formaldehyde-yielding substance is not formaldehyde itself, the amount of material used will be based on the formaldehyde furnished by the substance.

The oil used in preparing the oil-soluble resin may be any vegetable or animal (including fish) drying oil. Examples of drying oils that may be employed are: linseed oil, poppy oil, tung oil (China-wood oil), oiticica oil, dehydroxylated castor oil, and the like, and of these, the use of tung oil or oiticica oil is preferred.

The amount of oil employed may vary widely depending upon the properties desired in the oil-soluble resin. Hence, the oil may be present in relatively small amounts, for example from a few per cent based on the weight of the phenol, and the upper limit is dependent upon the amount of oil that is compatible with the resin. The amount of oil that may be incorporated with the resin to produce an oil-compatible product will depend on the type of phenolic material reacted with the formaldehyde-yielding substance. When commercial cresylic acid is used, the amount of oil compatible with the resin may be 50% or more based on the weight of the phenolic material.

The process of the present invention provides several advantages as contrasted to the conventional methods of making oil-non-compatible and oil-soluble oil-containing phenol-formaldehyde resins. For example, the reaction time in the process is considerably less than that required for the production of a resin of the same degree of condensation by conventional methods. Moreover, resins made according to this invention have the advantageous property of being convertible to the final infusible, insoluble state in a length of time two to five times less than required for conventionally prepared resins of the same composition reacted for the same period of time. Also, resins prepared by the process of the present invention may be cured under heat and pressure at a much lower pressure. For example, when two resins prepared from the same materials, one made by conventional methods and the other made in accordance with this invention, were compared as to curing time, it was found that the conventionally prepared resins required approximately five times as long to cure and about twice as much pressure under similar temperature conditions as did the resin made according to this invention.

Furthermore, the mixing together of all the reactants prior to the initiation of the reaction, as is the practice in the preparation of phenolic condensation products according to conventional methods, results in a product which at times possesses low mechanical properties. This is thought to be due to the formation of a non-uniform mixture of mono- and di-alcohols and possibly some tri-alcohols. However, when the phenol is added to the hot solution of the formaldehyde-yielding substance in accordance with the process of the present invention, a product possessing uniformly high mechanical properties is produced, due to the formation of a more uniform composition which, it is believed, comprises predominantly the di-alcohols. Moreover, the phenolic condensation products of the present invention are more compatible with drying oils than are the conventional resins, as evidenced by the fact that oil-soluble resins may be prepared in accordance with the present invention without the use of acids or dehydrating agents. This advantageous property of compatibility is thought to be due to the predominance of the di-alcohols.

As is illustrated by the tables hereinafter set forth, the oil-non-compatible resins provide products which are stronger mechanically than the conventional phenol-formaldehyde type of resins. Furthermore, products, such as laminated sheets, prepared by the use of the oil-soluble resin compositions of the present invention, are superior in electrical properties to similar products made from the conventional oil-soluble phenol-formaldehyde type of resin.

The oil-non-compatible and oil-soluble resins may be used in any desired manner in the production of products in which the resin is converted into the final infusible, insoluble stage. They are particularly advantageous for use as a varnish or coating or impregnating agent after they have been dissolved in an organic solvent such as alcohols, acetone, or a mixture of alcohol and benzol. For example, laminated products may be produced from the resin by impregnating paper, textile fabric, asbestos or glass fibre sheet material and the like with the potentially reactive resin of the invention dissolved in a suitable solvent. The impregnated material is passed through an oven where the solvent is removed and the resin cured to a limited extent. The impregnated stock is then cut into sheets of the desired size and a laminated structure is formed by superimposing one impregnated sheet upon another until the required thickness is obtained. The superimposed sheets are placed in a mold, for example, between the platens of a press, and subjected to heat and pressure to convert the resin to the insoluble, infusible form and to provide a unitary product. Instead of using sheet material, the resin may be used in conjunction with wood flour, small pieces of paper or fabric, and the like, or other so-called fillers and the resulting molding material subjected to heat and pressure in a mold to form an article of the desired shape and to convert the resin to the final insoluble, infusible stage.

Referring to the oil-non-compatible resins, the following tables will illustrate that laminated products made therewith are stronger mechanically than products made using a conventional resin. The base filler of both laminates was a 10 pt. alpha paper and the laminated products were prepared as above described.

| Material | Tensile Strength (lbs. per sq. in.) | | Flexural Strength (lbs. per sq. in.) | | Impact Strength (Izod, foot lbs.) | |
|---|---|---|---|---|---|---|
| | MD[1] | CD[2] | MD[1] | CD[2] | Edgewise | Foldwise |
| ⅛" laminate made with resin of present invention | 16,000 to 17,500 | 12,000 to 14,950 | 26,750 | 20,700 | 0.613 to 0.422 | 0.704 to 0.499 |
| ⅛" laminate made with conventional resin | 9,650 to 12,570 | 8,400 to 9,600 | 25,500 | 16,350 | 0.372 to 0.414 | 0.613 to 0.422 |

[1] Machine direction.
[2] Cross machine direction.

In addition to their high mechanical strength, the oil-non-compatible resins of the invention are characterized by fast-curing properties. The dielectric loss properties of the resin when used in a laminated product is also superior to the dielectric loss properties of a product made with a conventional resin.

Referring to the oil-soluble resins, the following table will illustrate the improved electrical properties of a laminated product made with an oil-soluble resin as compared to a product made from a conventional oil-soluble resin. The laminated materials were made by impregnating a high-grade alpha paper with (a) the resin of Example 7 (hereinafter set forth) and (b) a conventional tung oil phenolic resin.

| Material | Power Factor[1] at $10^6$ Cycles | Dielectric Constant[1] at $10^6$ Cycles | Loss Factor at $10^6$ Cycles |
| --- | --- | --- | --- |
| Laminate 1/16" thick made with resin of Ex. 7 | 0.020 to 0.023 | 3.57 to 3.97 | 0.0715 to 0.0913. |
| 1/16" laminate made with conventional phenolic tung oil resin. | 0.027 to 0.032 | 3.85 to 4.50 | 0.1039 to 0.1442. |

[1] Conducted according to A. S. T. M. method.

In addition to the improved electrical characteristics, laminated material made by impregnating a high grade rag paper or alpha paper to a resin content of 50% to 65%, is very tough and flexible. The product is also very resistant to moisture and is particularly suitable for radio frequency insulation where low dielectric loss properties are essential.

The following examples will illustrate the invention but are not to be considered as restricting the scope of the invention. All proportions given are by weight.

*Example 1*

500 parts of commercial cresylic acid and 25 parts of ammonium hydroxide (28%–29% NH₃) are added to a boiling solution of 600 parts of 37% formaldehyde. It requires about 5 minutes to add the cresylic acid mixture to the boiling formaldehyde solution. The mixture is then refluxed for from 5 minutes to 1 hour and then distilled under a vacuum of 27 inches of mercury to a temperature of about 95° C. The resulting resin is completely soluble in alcohol or a mixture of alcohol and toluene or similar solvents.

The curing time of the above resin will, of course, depend on the degree to which the resin has been reacted. However, a resin made with the same composition and reacted the same period of time by the conventional method has a curing time of from 2 to 5 times as long as the resin described above. For example, the above resin reacted for one hour and dissolved in alcohol to form a 60% solution has a curing time, as determined by the "stroke" method, at 150° C., of 40 to 70 seconds as compared to 120 to 180 seconds for a varnish made from a resin prepared by the conventional method.

*Example 2*

500 parts of commercial cresylic acid and 25 parts of ammonium hydroxide are added to a boiling solution of 500 parts by weight of 37% formaldehyde. The mixture is refluxed for 45 minutes and then distilled under the vacuum conditions of Example 1. The resulting resin is soluble in alcohol or a mixture of alcohol and toluene or similar solvents, and a 60% alcohol solution thereof has a "stroke" curing time of about 75 seconds.

*Example 3*

500 parts of phenol U. S. P. and 2.5 parts of sodium hydroxide are added to a boiling solution of 700 parts of 37% formaldehyde, the addition requiring about 5 minutes. The mixture is refluxed for 35 minutes and then distilled under the vacuum of 27 inches of mercury to a temperature of 85°–90° C. A 60% alcohol solution of this resin has a "stroke" set time of 40 to 75 seconds.

*Example 4*

Immediately after adding the cresylic acid and catalyst to the boiling formaldehyde solution in Example 1, 250 parts of tung oil are added. The mixture is refluxed for 5 minutes to 1 hour and then dehydrated either under a vacuum or under atmospheric conditions, the product being heated up to a temperature of 125° C. to 145° C. during the dehydration. The resulting product is a yellowish-brown, clear resin which shows no oil separation when heated for a period of time to form an insoluble, infusible resinous composition.

*Example 5*

Immediately after the addition of 500 parts of commercial cresylic acid and 22 parts of ammonium hydroxide (28%–29% NH₃) to 540 parts of boiling 37% formaldehyde, 250 parts of oiticica oil are added. The mixture is refluxed for from 15 minutes to 2 hours and then distilled under a vacuum or at atmospheric conditions to a temperature of 125° C. to 150° C. The resulting product is a yellowish-brown, clear resin soluble in a mixture of alcohol and toluene. No oil separation occurs when the resin is converted to the insoluble, infusible form.

*Example 6*

A mixture comprising 300 grams of commercial cresylic acid, 150 grams of China-wood oil and 1½ grams of sodium hydroxide dissolved in water to form a ½% solution is added gradually to the boiling solution of 325 grams of 37% formaldehyde. The mixture is reacted for 2 minutes and then immediately distilled under a vacuum to 130° C. The resulting resin is a yellowish-brown, very viscous material that possesses fast curing properties.

*Example 7*

A mixture of 1500 pounds of commercial cresylic acid, 75 pounds of ammonium hydroxide and 600 pounds of China-wood oil are added over 18 minutes to a boiling solution of 1400 pounds of 37% formaldehyde. The temperature throughout is maintained at 97° C. to 100° C. The mixture is refluxed for 15 minutes at 100° C. and is then distilled under a vacuum of 24 inches to 27 inches to 125° C. The resulting resin is a yellowish-brown, very viscous material. The resin is dissolved in a solvent composed of 350 parts of alcohol and 90 parts of benzol. The resin possesses the following physical properties:

Viscosity _____ C. P. S__ 1320
Solids content _____ per cent__ 61
Specific gravity _____ 1.015
Set time test conducted on a hot plate at
  150° C _____ seconds__ 180

The set time is determined by pouring about a quarter teaspoonful of the varnish on to the surface of the hot plate at 150° C. A spatula is then used to work the varnish back and forth until the resin has been converted to a rubbery or hard material which no longer flows (the set time). This "stroke" test indicates that the varnish is convertible into the insoluble, infusible stage and indicates the rate of curing of the resin.

The oil-soluble resins may be further mixed with rosin or methyl abietate or similar materials and reacted further with more oil to produce air-drying varnishes possessing unusual strength and electrical properties. For example, to 500 parts of the oil-soluble resins of Example 4 there may be added 200 to 300 parts of rosin and the mixture then heated to from 110° C. to 150° C. 100 parts of tung oil are added and the heating continued until the resulting clear transparent resin can be dissolved in toluene or high boiling naphtha or other suitable solvents, and used as a drying varnish. Driers such as lead, zinc, and copper naphthenates or resinates or other suitable driers may be added to either the resin or varnish to produce an air-baking varnish.

Considerable modification is possible in the methods of combining the reactants, as well as the relative proportions thereof, without departing from the essential features of the invention.

I claim:

1. The process of producing an initial heat-convertible phenol-formaldehyde resinous product which comprises adding a free monohydric phenol capable of reacting with formaldehyde to form a heat-convertible resin to a hot aqueous solution of a substance yielding free formaldehyde selected from the group consisting of formaldehyde, paraformaldehyde, and hexamethylenetetramine maintained at a temperature between 70° C., and its boiling point, the amount of formaldehyde being sufficient to form a heat-convertible resin, reacting said phenol and the formaldehyde in the presence of a basic catalyst to form a resinous condensation product, and removing excess water from said product.

2. The process of claim 1 wherein the hot solution of the formaldehyde-yielding substance is maintained at a temperature above 80° C.

3. The process of claim 1 wherein the hot solution of the formaldehyde-yielding substance is maintained at a temperature above 90° C. and the reaction is conducted at the refluxing temperature of the reaction mixture.

4. The process of claim 3 wherein the phenol is commercial cresylic acid and the formaldehyde-yielding substance is formaldehyde.

5. The process of making an oil-non-compatible initial heat-convertible phenol-formaldehyde resinous product which comprises preparing a mixture consisting essentially of a free monohydric phenol capable of reacting with formaldehyde and an aqueous solution of a substance yielding free formaldehyde selected from the group consisting of formaldehyde, paraformaldehyde and hexamethylenetetramine by adding said phenol to a hot aqueous solution of the formaldehyde-yielding substance maintained at a temperature between 70° C., and its boiling point, the amount of formaldehyde being sufficient to form a heat-convertible resin, reacting said phenol and the formaldehyde in the presence of a basic catalyst to form a resinous condensation product and removing excess water from said product.

6. The process of claim 5 wherein the hot solution of the formaldehyde-yielding substance is maintained at a temperature above about 80° C.

7. The process of claim 5 wherein the hot solution of the formaldehyde-yielding substance is maintained at a temperature above 90° C. and the reaction is conducted at the refluxing temperature of the reaction mixture.

8. The process of claim 7 wherein the phenol is commercial cresylic acid and the formaldehyde-yielding substance is formaldehyde.

9. The process of making an oil-containing initial phenol-formaldehyde resinous product which comprises adding free monohydric phenol, of which at least 15% is xylenol and not more than 30% is the compound, phenol, capable of reacting with formaldehyde to form a heat-convertible resin and a drying oil selected from the group consisting of vegetable and animal drying oils; to a hot aqueous solution of a substance yielding free formaldehyde selected from the group consisting of formaldehyde, paraformaldehyde and hexamethylenetetramine maintained at a temperature between 70° C., and its boiling point, the amount of formaldehyde being sufficient to form a heat-convertible resin, the said drying oil being added before condensation of the phenol alcohols resulting from the reaction of the phenol and formaldehyde has progressed substantially, reacting said phenol, formaldehyde, and oil in the presence of a basic catalyst, and during said reaction heating said reaction mixture to a temperature of at least 120° C. to form a resinous oil-containing condensation product, and removing excess water from said product.

10. The process of claim 9 wherein the hot solution of the formaldehyde-yielding substance is maintained at a temperature above 80° C., wherein the drying oil is tung oil, and wherein the formaldehyde-yielding substance is formaldehyde.

11. The process of claim 9 wherein the hot solution of the formaldehyde-yielding substance is maintained at a temperature above 80° C., wherein the drying oil is oiticica oil, and wherein the formaledhyde-yielding substance is formaldehyde.

12. The process of claim 9 wherein the drying oil is added to the hot solution of the formaldehyde-yielding substance not later than immediately after the addition of the phenol thereto, wherein the hot solution of the formaldehyde-yielding substance is maintained at a temperature above 90° C., wherein the drying oil is tung oil, and wherein the phenol is commercial cresylic acid and the formaldehyde-yielding substance is formaldehyde.

13. The process of claim 9 wherein the drying oil is added to the hot solution of the formaldehyde-yielding substance not later than immediately after the addition of the phenol thereto, wherein the hot solution of the formaldehyde-yielding substance is maintained at a temperature above 90° C., wherein the drying oil is oiticica oil, and wherein the phenol is commercial cresylic acid and the formaldehyde-yielding substance is formaldehyde.

14. The initial heat-convertible phenol-formaldehyde resinous product obtained by the process of claim 1.

15. The oil-non-compatible initial heat-convertible phenol-formaldehyde resinous product obtained by the process of claim 5.

16. The oil-containing initial heat-convertible phenol-formaldehyde resinous product obtained by the process of claim 9.

17. An infusible insoluble phenol-formaldehyde resinous product comprising the heat-converted initial resinous product obtained by the process of claim 1.

18. An infusible, insoluble phenol-formaldehyde resinous product comprising the heat-converted initial resinous product obtained by the process of claim 5.

19. An infusible, insoluble oil-containing phenol-formaldehyde resinous product comprising the heat-converted initial resinous product obtained by the process of claim 9.

RAYMOND PALMER.

REFERENCES CITED

The following references are of record in the file of this patent:

UNITED STATES PATENTS

| Number | Name | Date |
|---|---|---|
| 1,632,113 | Brown | June 14, 1927 |
| 1,680,408 | Brown | Aug. 14, 1928 |
| 2,053,850 | Sturken | Sept. 8, 1936 |
| 2,114,121 | Bender | Apr. 12, 1938 |
| 2,356,466 | McNally et al. | Aug. 22, 1944 |

FOREIGN PATENTS

| Number | Country | Date |
|---|---|---|
| 12,021 | Australia | 1928 |